United States Patent
Eplee et al.

(10) Patent No.: US 7,824,766 B2
(45) Date of Patent: Nov. 2, 2010

(54) SORPTION PAPER AND METHOD OF PRODUCING SORPTION PAPER

(75) Inventors: Dustin Matthew Eplee, State College, PA (US); Kenneth R. Butcher, Hendersonville, NC (US)

(73) Assignee: Energy Wall, LLC, Boalsburg, PA (US)

( * ) Notice: Subject to any disclaimer, the term of this patent is extended or adjusted under 35 U.S.C. 154(b) by 343 days.

(21) Appl. No.: 11/986,483

(22) Filed: Nov. 20, 2007

(65) Prior Publication Data
US 2009/0126898 A1  May 21, 2009

(51) Int. Cl.
*B32B 5/16* (2006.01)
*B32B 5/18* (2006.01)
*D21F 11/00* (2006.01)

(52) U.S. Cl. .................... 428/323; 162/157.2; 162/158; 162/181.1

(58) Field of Classification Search ................. 442/164, 442/166; 162/157.2, 157.4, 158, 181.1, 181.2, 162/181.9; 428/323
See application file for complete search history.

(56) References Cited

U.S. PATENT DOCUMENTS

| | | | |
|---|---|---|---|
| 4,134,743 A | 1/1979 | Macriss et al. | |
| 4,160,059 A | 7/1979 | Samejima | |
| 4,341,539 A | 7/1982 | Gidaspow et al. | |
| 4,361,620 A | 11/1982 | Newton | |
| 4,377,400 A | 3/1983 | Okamoto et al. | |
| 4,402,717 A | 9/1983 | Izumo et al. | |
| 4,484,938 A | 11/1984 | Okamoto et al. | |
| 4,871,607 A | 10/1989 | Kuma et al. | |
| 4,875,520 A | 10/1989 | Steele et al. | |
| 4,886,769 A | 12/1989 | Kuma et al. | |
| 4,911,227 A | 3/1990 | Saito et al. | |
| 4,911,775 A | 3/1990 | Kuma et al. | |
| 5,135,548 A | 8/1992 | Golden et al. | |
| 5,435,958 A | 7/1995 | Dinnage et al. | |
| 5,580,370 A | 12/1996 | Kuma et al. | |
| 6,143,390 A | 11/2000 | Takamiya et al. | |
| 6,265,030 B1 | 7/2001 | Aronson | |
| 6,358,300 B1 | 3/2002 | Fornof et al. | |
| 6,361,588 B1 | 3/2002 | Moratalla | |
| RE37,779 E | 7/2002 | Kuma et al. | |
| 6,440,489 B1 | 8/2002 | Aronsson | |
| 6,559,096 B1 | 5/2003 | Smith et al. | |
| 6,565,999 B1 | 5/2003 | Haogland | |
| 6,820,681 B2 * | 11/2004 | Ohgami et al. ................. | 165/10 |
| 6,951,242 B1 | 10/2005 | Des Champs et al. | |

(Continued)

FOREIGN PATENT DOCUMENTS

JP  53001358 A  1/1978

(Continued)

*Primary Examiner*—Jenna-Leigh Johnson
(74) *Attorney, Agent, or Firm*—Carter, Schnedler & Warnock (57) ABSTRACT

A paper material having water sorption capacity and method for forming the same is provided. The paper material may be formed from a mixture including thermoplastic organic fibers, micro porous particles, and hydroscopic salt or a mixture including organic fibers, titania or a transition alumina micro porous particles, and a hydroscopic salt. The paper may be produced by forming an aqueous slurry, including organic fibers and micro porous particles, mixing the slurry, feeding the mixed slurry into a paper making apparatus thereby forming a sheet, contacting the sheet with a solution containing an amount of hydroscopic salt, and drying the hydroscopic salt containing solution.

27 Claims, 5 Drawing Sheets

U.S. PATENT DOCUMENTS

| | | |
|---|---|---|
| 7,188,665 B2 | 3/2007 | Arai et al. |
| 7,217,313 B2 | 5/2007 | Motono et al. |
| 2002/0185266 A1 | 12/2002 | Dobbs et al. |
| 2003/0106680 A1 | 6/2003 | Serpico et al. |
| 2003/0118887 A1 | 6/2003 | Serpico et al. |
| 2003/0226656 A1 | 12/2003 | Harada et al. |
| 2004/0140085 A1 | 7/2004 | Dobbs et al. |
| 2005/0155491 A1 | 7/2005 | Faust et al. |
| 2005/0172805 A1 | 8/2005 | Motono et al. |
| 2005/0173998 A1 | 8/2005 | Klingenburg et al. |

FOREIGN PATENT DOCUMENTS

| | | |
|---|---|---|
| JP | 55142522 | 11/1980 |
| JP | 56003900 | 1/1981 |
| JP | 58219920 | 12/1983 |
| JP | 59007896 | 1/1984 |
| JP | 59177119 | 10/1984 |
| JP | 7019789 | 1/1995 |

\* cited by examiner

SORPTION PAPER AND METHOD OF PRODUCING SORPTION PAPER

FIELD OF THE INVENTION

The invention relates to a paper material used for the sorption and separation of water from air and for the transfer of heat and/or moisture from one air stream to another. More particularly it relates to a paper in which a higher concentration by weight of the absorbent lithium chloride is permanently held through capillary forces by imbedded micro porous particles interwoven in and retained by a fibrous paper and allowing for operation in highly saturated air streams. In addition, it relates to paper compositions which allow the paper to be corrugated and/or calendared without the need of additional adhesive materials.

BACKGROUND OF THE INVENTION

For the construction of various devices intended for the exchange of heat and/or water vapor between two air streams it is desirable to have a thin inexpensive material which removes moisture from one of the air streams and transmits it to the other air stream. In some devices it is also desirable that heat and moisture be transmitted across the thickness of material such that the heat and water is transmitted from one stream to the other while the air itself is not transmitted.

For example, to improve indoor air quality, there is a great need to increase levels of outdoor air ventilated into buildings. However, it is important to minimize the cost associated with the introduction of outside air. For example, in winter, introducing cold, dry outdoor air to a building increases the heating load and adds to the fuel requirement. In summer, introduction of warm, humid outdoor air adds greatly to the air conditioning costs. Thus, to minimize costs associated with introduction of fresh air, heat exchangers such as rotating wheel exchangers or plate type heat exchangers have been employed to recover or reject, as needed, a portion of the sensible heat from the indoor air stream through exchange with the outdoor air stream. Further, some of the heat exchangers provide for latent heat exchange by incorporating a means to transmit moisture into the heat exchange surface.

One well know design for constructing heat exchangers employs a rotating wheel made of an open honeycomb structure. The open passages of the honeycomb are oriented parallel with the axis of the wheel and the wheel is rotated continuously on its axis. If applied to heat exchange for building ventilation, outside air would be made to pass through one section of the wheel while inside air would be made to pass in the opposite direction through another portion of the air. Since the heat would be absorbed in one section of the wheel and rejected in the other portion of the wheel, heat is effectively transferred from one stream to the other. For example, in the winter, cold air from the outside would pick up heat from the wheel as it passes through while the wheel is reheated by interior air being exhausted through another portion of the wheel. The reverse would be true in the summer months.

The effectiveness of the heat exchange is greatly enhanced if the material of the wheel is made of desiccant material because, in addition to the exchange of sensible heat from the air, the latent heat of condensing and evaporating moisture from the air is also exchanged, at least to an extent. These wheels can also be employed in many other applications besides buildings.

Heat exchange wheels are usually fabricated to provide a multiplicity of parallel pores or openings such as a honeycomb structure through which air passes. The wheels can be formed from coated material such as aluminum, plastic, and paperboard or desiccant paper having one side corrugated and one side flat. The wheels are commonly formed by winding or stacking the coated material or desiccant paper into the wheel shape to provide air passageways parallel to the axis of the wheel.

Herewithin, adsorption is defined as a process in which water vapors move from a gas phase onto a solid surface. Adsorption is to be distinguished from absorption, a process in which water vapor moves into the bulk of a porous material, such as the absorption of water by a sponge. Sorption is a more general term that includes both adsorption and absorption and is used herein to mean either adsorption or absorption.

Desiccant wheels are typically constructed using solid-state desiccant material with very high surface areas to adsorb water vapor molecules from an air stream. Solid desiccant wheels are characterized by high substructure weights, low moisture adsorption rates, high air pressure drops, high manufacturing costs, high regeneration temperatures, susceptibility to frost formation, performance degradation over time, bacterial buildup, gaseous cross-contamination, and are clogged by particulate matter.

Powerful liquid desiccants, such as lithium chloride, have been applied to asbestos and cellulous substrates with limited success in the past. Lithium chloride will dissolve into a liquid salt solution upon exposure to a high relative humidity air mass. The liquid salt solution can flow off of the wheel substructure rendering the wheel ineffective. In addition, lithium chloride can become entrained in the air stream and cause corrosion to downstream components. In order to overcome this "weeping" problem, a very low practical limit in the amount of salt desiccant impregnated into the wheel is used. For example, this is on the order of maximum of 11-12% wt. of the substrate for LiCl and up to 25-27% wt. of the substrate for LiBr. As a result of this low amount of desiccant, these desiccant wheels must be very large with a high surface area to have any appreciable capacity. For example, a low desiccant/support ratio, on the order of 0.1 for LiCl, necessitates uneconomically large wheels having great masses of substrate material for the desiccant support, which in turn imposes substantial power requirements for rotation, and heat requirements for regeneration. In certain prior art designs, higher LiCl concentrations as indicated eventually lead to desiccant deliquescence.

In certain applications of dehumidifying elements, it is necessary for the dehumidified air to be very dry. For example, a dew point of beneath −40 degree F. is required when drying plastic granules for the manufacture of PET-products, while still lower moisture contents are sometimes required in respect of dehumidifying air in chambers where moisture sensitive products are tested. A rotor that solely contains solid desiccant particles can not reach these states without unreasonably high temperatures and energy consumption by the regeneration process. Thus, there is a need for novel dehumidifying elements that are able to generate still drier air than that which can be achieved with the dehumidifying element based on solid desiccants.

As stated previously, one economical method of fabricating a wheel type heat exchanger is to form a corrugated sheet and then to roll up or lay up layers of the corrugated material to form the wheel. In a typical commercial corrugation machine one piece of paper or membrane is passed through a pair of slotted or gear-shaped heated rollers to impart to it the corrugated wavy shape. This shaped piece is commonly called the medium. This corrugated sheet or medium is then brought into contact with a flat sheet commonly called the liner. The two are bonded together by applying some adhesive to the top portions of the medium sheet and pressing the medium and liner together between a corrugated roller and flat roller. This forms what is know in the industry as a single sided corrugated material.

Corrugated materials such as common corrugated cardboard used for packaging are generally made from relatively impervious paper precursors. If relatively impervious material is used the application of the adhesive and subsequent bonding of the medium to the liner presents no special problem. However, for the construction of desiccant or heat exchange wheel it is desirable to use a highly porous paper as a precursor. When the adhesive is applied and the medium and liner are pressed together there is a tendency for the adhesive to flow through the paper where it will eventually build up on the forming wheels and cause the medium and liner to delaminate from each other upon exiting the machine. Another problem is that the adhesive tends to flow in all directions within the paper causing a reduction in the porosity and therefore a reduction in the ability of the product to absorb liquids.

As an alternate to the rotating wheel design, some heat exchangers are made with a series of parallel plates. Spaces are provided between these plates to allow two different air steams to pass and the manifolds for such plate type heat exchangers are arranged such that the two different air steams pass on alternate sides of the plates. The plates allow for the exchange of heat between the two air steams while preventing the air streams from coming into contact with each other or mixing with each other.

For example, in the case of a ventilation system for a building, the outside air being brought into the building would constitute one of the air streams and the inside air being ejected from the building would constitute the other stream. In the summer, the hot moist outside air being brought in would be cooled to an extent by the cool dry inside air while it is exhausted. In this way at least a portion of the energy required to cool the interior of the building would be recovered.

Traditionally the plates of such heat exchangers are made from metal or some material that is thin and can conduct heat well.

The efficiency of this type of heat exchanger can be greatly increased if, in addition to transferring sensible heat by simple conduction, water can also be transmitted. In this case the latent heat of vaporization of the water may also be at least partially recovered in addition to the sensible heat transferred by thermal conduction.

Attempts to do this have employed very expensive and specialized polymeric membranes, but have not as yet enjoyed wide spread practical use.

Although the above description has focused upon heat and moisture exchange for buildings, it should be apparent that the same principles may be applied to many other applications as well, such as: heat and moisture exchange for commercial, industrial and food processing; desiccant applications for drying of process air; water recovery from air; and the humidification of air and fuel for fuel cells by recovery of water from the exhaust of the same.

Thus, a need exists to create a material for improving wheel type heat exchangers and plate type heat exchangers.

In the case of a wheel type exchanger, the material should adsorb and/or absorb a large quantity of moisture from the air and subsequently release this moisture when heated or exposed to less humid air. It must be inexpensive, strong, light in weight, resistant to bacterial growth and be readily corrugated or otherwise formed into a honeycomb shape which allows air to pass through while maintaining a low pressure drop. In the case of plate type exchangers, the material should adsorb and/or absorb large quantities of moisture from the air, transmit the moisture through from one face to the other while not allowing the air itself to pass through. It must be formable in thin strong lightweight sheets, be inexpensive, and be resistant to bacterial growth.

OBJECTS OF THE INVENTION

Therefore, an object of the present invention is to provide an improved paper material having water sorption capacity.

Another object of this invention is to provide methods for providing an improved paper material having water sorption capacity.

A further object of this invention is to provide a highly desiccant paper which may be corrugated and/or calendared without the need of additional adhesives or binders.

SUMMARY OF THE INVENTION

In accordance with one form of this invention there is provided a paper material having water sorption capacity. The paper material includes a mixture of thermoplastic organic fibers, micro porous particles, and a hydroscopic salt.

In another form of this invention there is provided a paper material having water sorption capacity. The paper material includes a mixture of organic fibers, titania or a transition alumina micro porous particles, and a hydroscopic salt.

In another form of this invention there is provided a heat exchanger comprising a substrate. The substrate is formed from a paper material having water sorption capacity. The paper material is formed from a mixture including thermoplastic organic fibers, micro porous particles, and a hydroscopic salt.

In another form of this invention there is provided a heat exchanger, including a substrate. The substrate is formed from a paper material having water sorption capacity. The paper material includes a mixture of organic fibers, gamma alumina or titanium micro porous particles, and a hydroscopic salt.

In yet another form of this invention there is provided a method for forming a paper material having water sorption capacity. An aqueous slurry, including organic fibers and micro porous particles, is formed. The aqueous slurry is mixed. The mixed slurry is fed into a paper making apparatus, thereby forming a sheet of paper. The sheet is contacted with a solution containing an amount of hydroscopic salt. The hydroscopic salt containing solution is dried.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

The improved desiccant paper includes micro porous particles, fibrous material, preferably including natural cellulose fibers, as well as synthetic thermoplastic fibers such as polyvinyl alcohol polymer fibers, bicomponent fibers and micro fibers. Preferably, the micro porous particles are transition alumina, such as gamma alumina and/or titania. In addition, the paper may contain certain binders such as soluble PVA or hydrophilic latex or starch. This composition is formed into paper by conventional paper making techniques. The paper is cut and/or formed into the desired shape for the device and is heated. Forming steps may include corrugation and/or calendaring where the paper is self-adhering owing to the inclusion of thermoplastic fibers, which are responsive to heat, with the paper structure. Subsequent to these steps a liquid hydroscopic salt desiccant such as lithium chloride is added as a brine solution and is adsorbed into and held substantially permanently by the paper structure.

The micro porous particles can be any material capable of efficiently holding liquids through capillary action and surface tension. The micro porous material may itself also be capable of efficiently adsorbing/desorbing said moisture to a counter flowing air stream. Examples of such micro porous particles are activated aluminas, silica gels, molecular sieves, porous titania, or zeolites, activated carbon and the like and mixtures of these compounds. The preferred solid micro porous particles are a transition alumina such as gamma aluminas due to their inert properties, lower cost, and wide market availability. These materials are activated for adsorption by removing water from their hydrated precursors. Activated aluminas have a wide pore size distribution. An example of commercially available gamma alumina is VGL 15 produced by U.O.P Corporation.

The preferred complimentary liquid desiccant is a hydroscopic salt namely lithium chloride. Hydroscopic salts, like LiCl, make excellent desiccants. The free energy of hydration, $\Delta G$ hyd, is so large for such salts that, upon exposure to typical ambient room air; they dissolve in their own waters of hydration. There are several adsorption products on the market and in limited commercial use, mostly based on solid adsorbents like zeolite or high surface area silica, alumina, titania, or combinations of these. Lithium Chloride has at least three (3) major advantages over conventional solid desiccants.

(1) Lithium Chloride has significantly smaller absorption-evaporation cycle hysteresis characteristics than the adsorption-desorption cycle of conventional solid desiccants. Energy losses per hydration-dehydration process cycle are smaller for liquefying lithium chloride than they are for typical solid desiccants. A desiccant wheel based on the application of liquid desiccants is inherently more energy efficient than a system based on conventional solid desiccant surfaces.

(2) Lithium Chloride has a much lower regeneration temperature than conventional solid desiccants. A desiccant wheel system based on the application of lithium chloride can, in principle, regenerate using temperatures lower than 104 F.

(3) Lithium Chloride has a much higher relative water mass uptake capacity then conventional solid desiccants. Upon dissolution, for example, a LiCl ion pair generates two hydration shells comprised of a total of 26 water molecules (e.g. 26 moles of water per molar equivalent of dissolved solute). Only a few water molecules may be condensed and held within a traditional solid desiccant crystallite. As a result, lithium chloride exhibits a 15-100 fold mass uptake advantage over traditional solid desiccants. This means that lithium chloride desiccant wheels, in principle, will be lighter and more compact than comparable systems based on traditional solid state adsorbents.

In the present invention, any type of fibrous material can be used that can be made to hold large amounts of liquids and micro porous particles and be formed by conventional paper-making processes into adsorbent paper or desiccant paper having adsorbent or desiccant contained therein. Examples of such fibers include wood pulp, e.g. cellulose fibers, and synthetic thermoplastic organic fibers and mixtures thereof. Inorganic fibers, such as glass or metal fibers and rock wool, etc., can also be used in conjunction with fibrillated organic fibers. Examples of preferred synthetic organic thermoplastic fibers useful in the invention include polymeric fibers such as polyethylenes, polypropylenes, polystyrenes, polyvinyl chlorides, polyesters, rayons (cellulose acetate), acrylics, acrylonitrile homopolymers, copolymers with halogenated monomers, styrene copolymers, and mixtures of such polymers. Natural cellulose fibers can also be used. Synthetic thermoplastic organic fibers can be in staple form (chopped yarns), fabricated form (staple that has been refined) or extruded/precipitated form. The more preferred fibers for forming into desiccant paper for use in the present invention are soft wood fiber Rayonier Poroganier, fiberglass, T-201 bicomponent, and Vonnel micro fiber and PVA fiber, Kuralon.

The paper of the present invention can be prepared by wet-laying the mixture of micro porous particles and fibers into a continuous sheet or web or into a hand sheet. The paper may then be formed into a single-faced corrugated-laminate, which is spirally wrapped to make the adsorbent wheel. Alternately, the paper may be pressed in a calendar under heat and pressure to make it more dense and relatively impervious to air flow. For purposes of making desiccant or adsorbent paper, the fibrous material is first dispersed in an aqueous dispersion.

Micro porous particles can be added to the dispersion containing the fibrous material or it may be dispersed separately in an aqueous solution to form an aqueous slurry. The amount of water used is an amount sufficient to provide a low viscosity slurry. Additives such as retention aids and binders suitable for maintaining the integrity of the desiccant paper or sorbent paper can be added to the slurry for purposes of improving paper strength by bonding fiber together to form a matrix and for retention of the micro porous particles on and within the fiber matrix. Binders which have been found suitable for use are polyvinyl alcohol and hydrophilic forms of latex. The final slurry being used for wet laying can contain 0.5 to 20% solids but preferably contains 2.5 to 4% solids.

Figure 3:
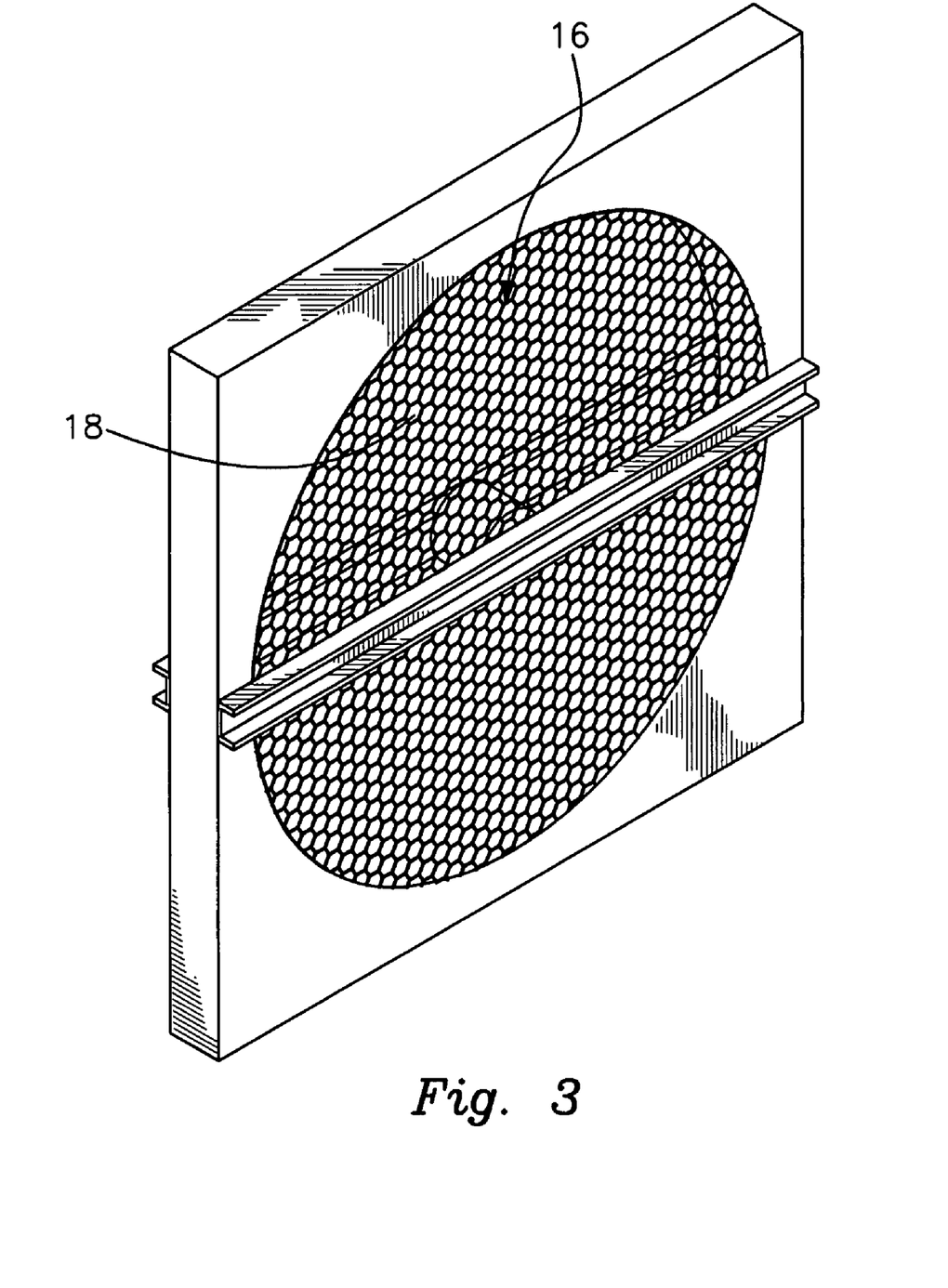
FIG. 3 is a perspective view of a sorption wheel which utilizes the paper material of the subject invention.
Figure 4:
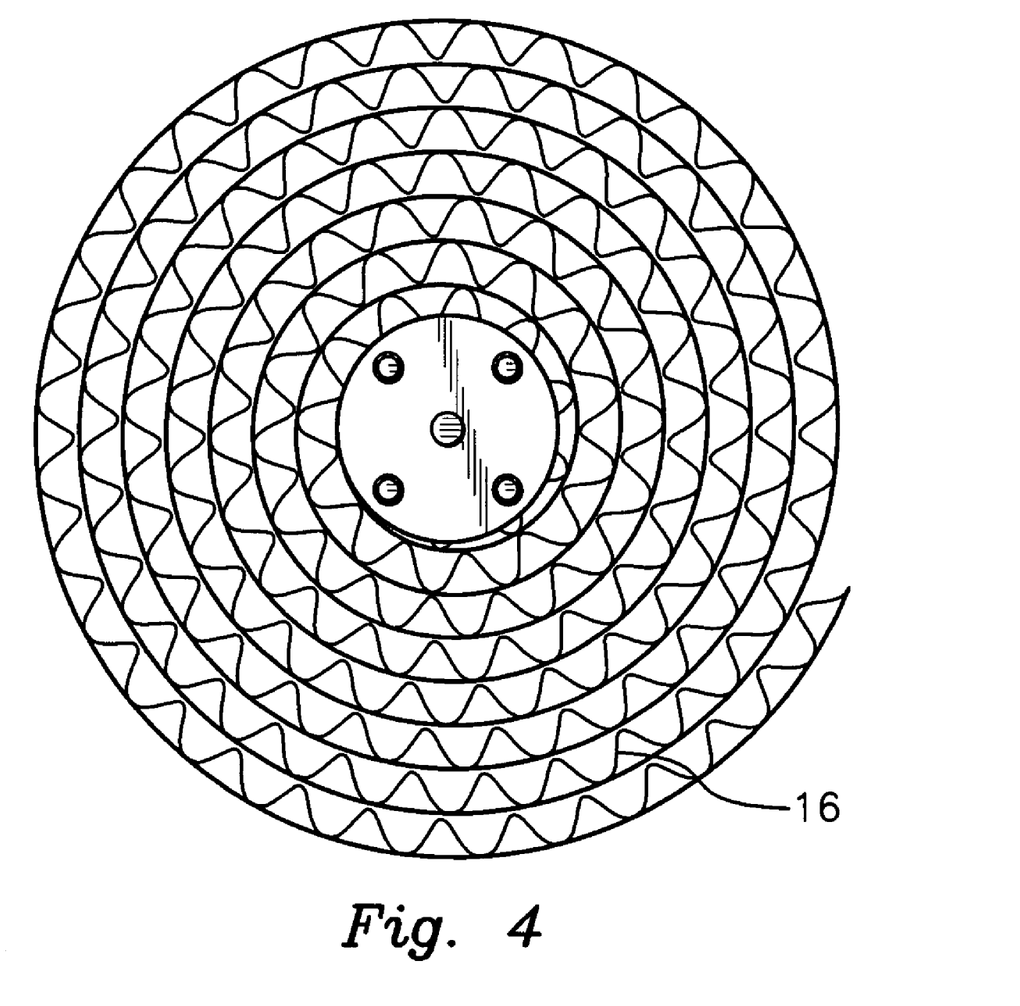
FIG. 4 is a perspective view showing the corrugated paper of the absorption wheel of FIG. 1 between octagonal mesh screens.
Figure 5:
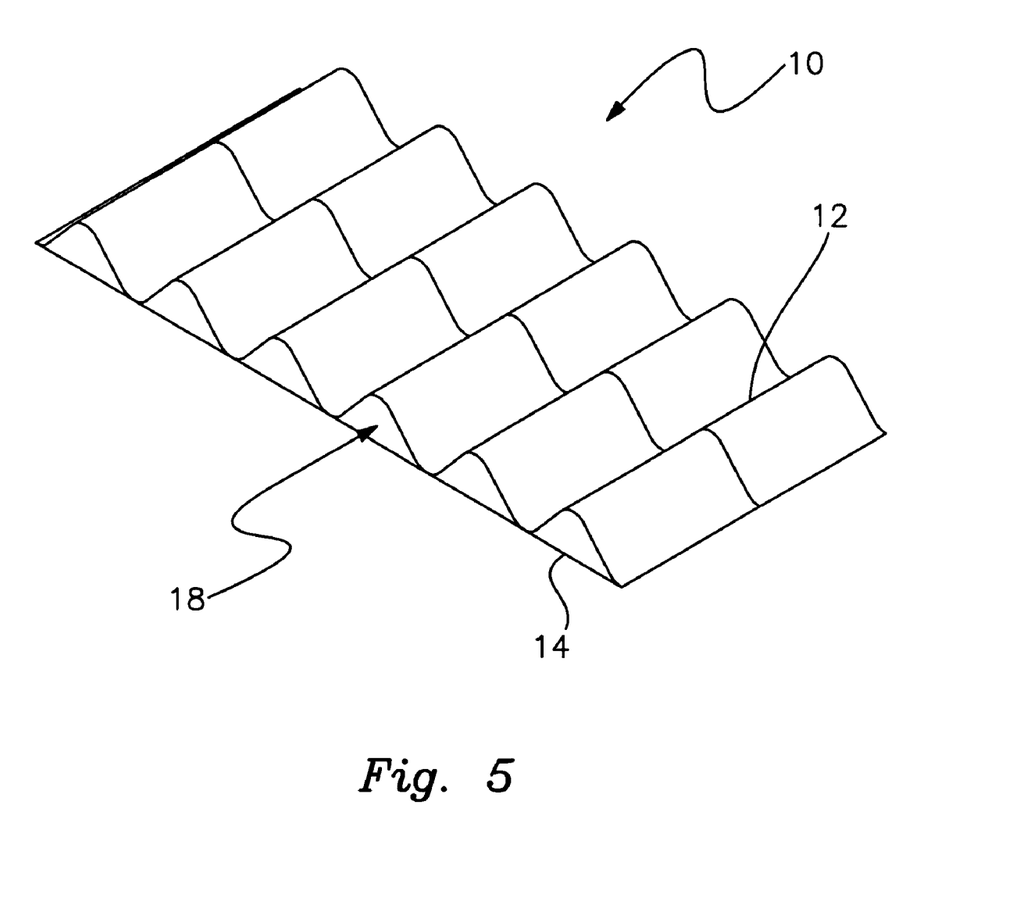
FIG. 5 is a perspective view showing one row of corrugated paper material.

The desiccant or adsorbent paper thus formed containing solid adsorbent dispersed therein during the paper manufacturing processes are formed into heat and moisture transfer bodies such as total energy transfer wheels or enthalpy wheels as shown in FIGS. 3 and 4. For example, the desiccant or adsorbent paper can be formed into such wheels by the formation of corrugated paper 10, as shown in FIG. 5, with a wavey layer 12 having the desired thickness and periodicity and bonded to a flat paperboard 14 of similar composition to produce a single-faced corrugated sheet. Because of the use of thermoplastic fibers, which act as a bonding agent when heated, there is no need to add an adhesive to form the corrugated sheet. The single-faced corrugated sheet is spirally rolled into a wheel configuration 16, as shown in FIGS. 3 and 4, with the passages or channels 18 formed by the corrugations and flat paperboard being parallel to the axial direction of the wheel. To maximize heat and mass transfer, the paperboard should be as thin as possible while maintaining strength to minimize the pressure drop across the wheel. Thin paperboard permits the manufacture of smaller channels to provide higher surface area for heat and mass transfer.

In this manner, an enthalpy wheel can be manufactured that provides for improved levels of moisture and heat transfer. Further, the enthalpy wheel can be readily mass produced in a cost effective manner. Conventional paper-making equipment and corrugating equipment can be used for manufacturing.

Figure 1:
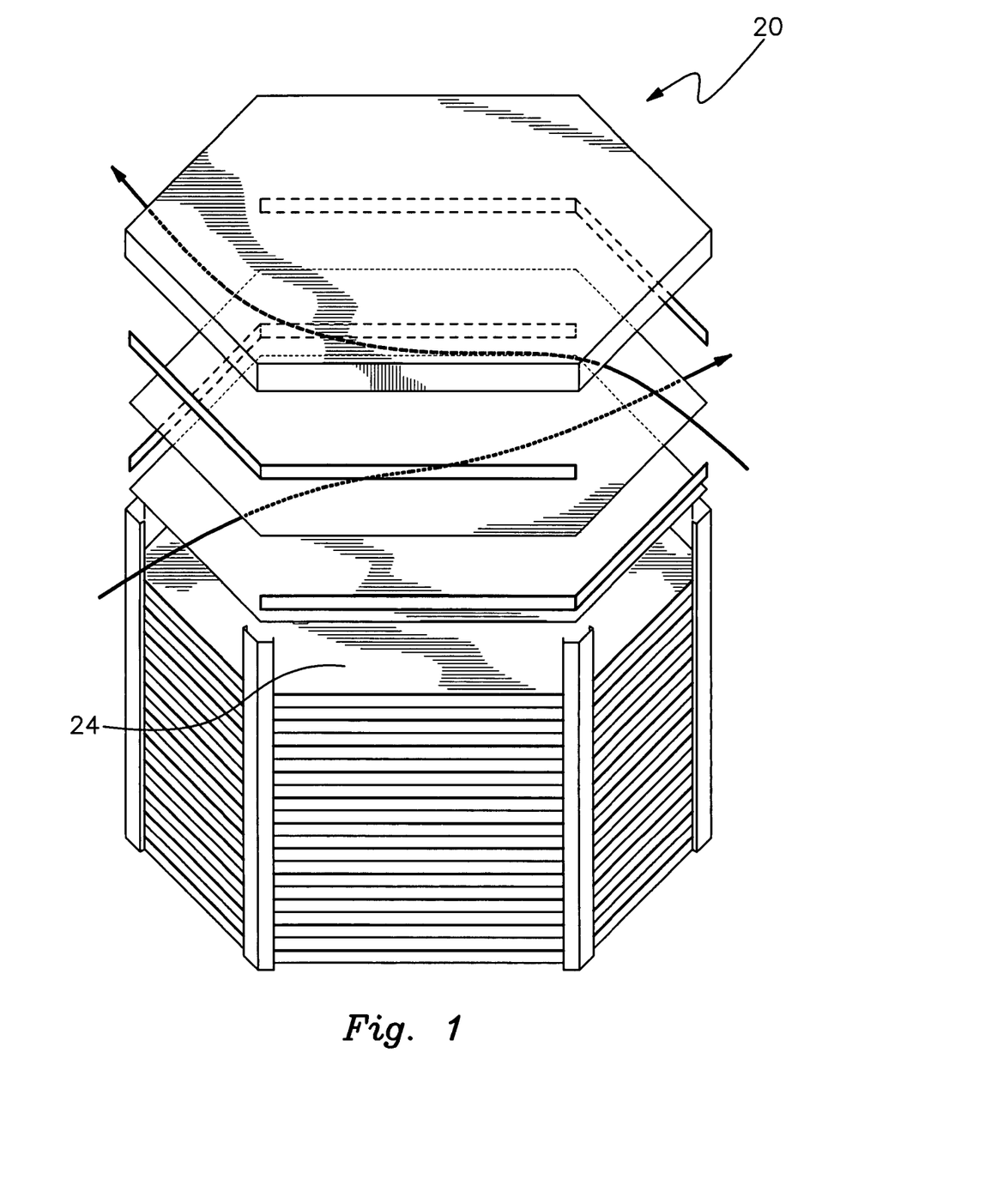
FIG. 1 is a perspective view of a counterflow heat and moisture plate energy exchanger which uses the paper material of the subject invention.
Figure 2:
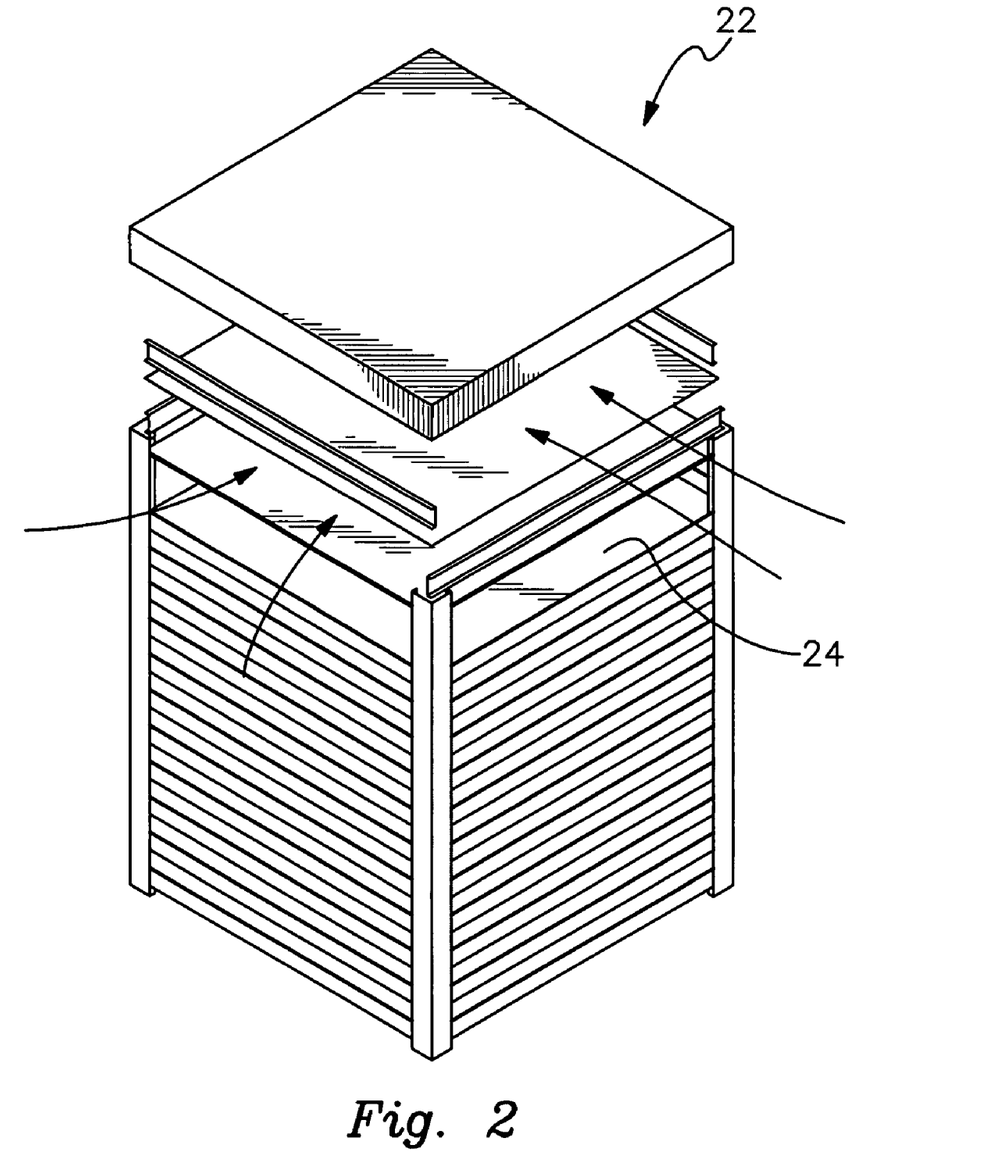
FIG. 2 is a perspective view of a cross-flow heat and moisture plate energy exchanger which utilizes the paper material of the subject invention.

If the paper is to be used as an element in a plate type exchanger, such as a counterflow exchanger 20 shown in FIG. 1 or a cross-flow exchanger 22 shown in FIG. 2, it is important that the paper 24 be relatively impervious to the flow of air through the paper. In order to achieve this one or more layers of the paper are passed through a heated calendar where the combination pressure and heat permanently compress the paper to a fraction of its original thickness. Again, because of the use of thermoplastic fibers, there is no need to add an adhesive.

In either case the formed paper is subsequently impregnated with a brine containing up to 8.3% wt. lithium chloride and then dried. This has the effect of depositing lithium chloride salt substantially homogeneously throughout the paper.

Organic synthetic fibers do not lose strength when wet, help hold the micro porous particles in the paper, and permit calendaring a flat plate type heat exchanger and the bonding of a corrugated sheet to a flat sheet for a wheel type heat exchanger without the need for an adhesive.

The following examples are provided to clarify the invention ad process used to manufacture the invention:

EXAMPLE 1

The following ingredients were weighted and mixed into approximately 500 gallons of water.

| component | identification | lbs in batch | % |
| --- | --- | --- | --- |
| soft wood pulp | Rayoniere Porgainer JHP | 70.6 | 44.3189 |
| fiber glass | ¼ inch length, 6 micro diameter | 4.7 | 2.950408 |
| bicomponent fiber | t-201 | 18.9 | 11.86441 |
| PVA fiber | Kuralon 2 × 4 mm | 2.8 | 1.75769 |
| gamma alumina | UPO Versal 250 prefired to 1000 F. | 62.3 | 39.1086 |
| total solids | | 159.3 | 100 |

The batch was mixed under high intensity and fed into a continuous pilot sized paper making line. In this line it was formed into a paper width of 2 feet and dried in a continuous manner, resulting in a paper thickness of 6-9 mils.

This paper was slit into widths of 9 inches and fed into a corrugation machine where it was formed into a single sided corrugated product with flutes approximately 4 mm in height. It was found that the corrugated sheet readily bonded to the flat paper component simply by the application of heat and pressure supplied by the machine.

This corrugated product was further slit and trimmed to 4 inches in width.

The 4 inch wide corrugated paper was wound onto a spindle forming a wheel with a diameter of 2 feet. Thus, the openings created by the corrugation flues resulted in a wheel through which air could be passed parallel to the axis of the wheel with little resistance.

The paper wheel thus formed was then placed into a solution consisting of 8% by weight lithium chloride and subsequently dried.

This wheel was placed in an appropriate mounting and housing and tested as heat and moisture exchange wheel. It was demonstrated to have a sensible heat exchange efficiency of 82%, a latent heat exchange efficiency of 80%, and a pressure drop of 0.75 inch wg while operating at a face velocity rate of 600 feet per minute.

EXAMPLE 2

The following ingredients were weighted and mixed into approximately 1500 gallons of water treated with a defoaming agent, Foamkill 830 F.

| component | identification | lbs in batch | % |
| --- | --- | --- | --- |
| soft wood pulp | Rayoniere Porgainer JHP | 38.18 | 13.52 |
| fiber glass | ¼ inch length, 6 micro diameter | 8.59 | 3.04 |
| bicomponent fiber | t-201 | 34.37 | 12.17 |
| PVA fiber | Kuralon 2 × 4 mm | 10.31 | 3.65 |
| micro fiber | Vonnel | 57.28 | 20.29 |
| gamma alumina | UPO VGL 15 | 114.55 | 40.57 |
| soluable pva | Cevol 205 S | 19.09 | 6.76 |
| total solids | | 282.37 | 100 |

The batch was mixed under high intensity and fed into a continuous pilot sized paper making machine. In this line it was formed into a paper width of 63 inches and dried in a continuous manner, resulting in a paper thickness of 18-21 mils.

This paper was slit into widths of 10 inches and fed between the heated rolls of a calendaring machine. In this step the combination of heat and pressure provide by the rolls caused the pertinent compression of the paper down to a thickness of 3.5-4.5 mils.

The calendared paper was checked for its ability to stop the flow of air through it. It was tested on a Fraiser test stand and showed less than 4.5 cc/min/in$^2$ at a pressure drop of 2 inch wg.

This paper was then cut into an elongated octagonal shape to form a counterflow design. The pieces were then placed into a solution consisting of 8% by weight lithium chloride and subsequently dried.

These elongated octagons were used to form the active membranes or plates of a counterflow plate-type heat exchanger. Specifically, 170 of these paper plates were stacked with a spacing of 0.07 inches between each sheet and the next. The spacing was created by using a corrugated plastic netting material. Appropriate seals and manifolds were provided such that two streams of air could be directed independently through alternating channels in the device.

The performance of the above device as a heat and moisture exchanger was excellent. It showed a sensible efficiency of 80% and a latent efficiency of 76%.

The following table shows the acceptable ranges of components together with preferred ranges of the components.

| Component | Acceptable Ranges Wt % | Preferred Ranges Wt % |
| --- | --- | --- |
| natural fibers | 0 to 50 | 0 to 20 |
| thermoplastic fibers | 5 to 30 | 5 to 50 |
| micro fibers | 0 to 50 | 5 to 30 |
| micro porous particles | 20 to 50 | 10 to 60 |
| binders | 1 to 5 | 0 to 10 |

From the foregoing description of the preferred embodiments of the invention, it is apparent that many modifications may be made therein. It should be understood, however, that these embodiments of the invention are exemplifications of the invention only and the invention is not limited thereto. It is to be understood therefore that it is intended in the appended claims to cover all embodiments and modifications as fall within the true spirit and scope of the invention.

The invention claimed is:

1. A paper material having water sorption capacity comprising:
a calendared sheet formed from a mixture including thermoplastic organic fibers, micro porous particles, and a hydroscopic salt; said hydroscopic salt is lithium chloride, lithium bromide, or combinations thereof.

2. A paper material as set forth in claim 1 wherein said micro porous particles are titania or a transition alumina.

3. A paper material as set forth in claim 1 wherein said particles are gamma alumina.

4. A paper material as set forth in claim 1 wherein said sheet being substantially impervious to the flow of air therethrough.

5. A paper material as set forth in claim 1 wherein said hydroscopic salt is lithium chloride.

6. A paper material as set forth in claim 1 wherein said thermoplastic organic fibers are polyvinyl alcohol, polyethylene, or bicomponent fibers made from two of the above fibers.

7. A paper material as set forth in claim 1 wherein a substantial amount of the hydroscopic salt is captured in the pores of the micro porous particles.

8. A paper material having water sorption capacity comprising:
a calendared sheet formed from a mixture including organic fibers, titania or a transition alumina micro porous particles, and a hydroscopic salt; said hydroscopic salt is lithium chloride, lithium bromide, or combinations thereof.

9. A paper material as set forth in claim 8 wherein organic fibers are thermoplastic.

10. A paper material as set forth in claim 9 wherein said fibers are polyvinyl alcohol, polyethylene, terathialate, acrylic polyethylene terathialate, or bicomponent fibers made from two of the above fibers.

11. A paper material as set forth in claim 8 wherein said sheet being substantially impervious to the flow of air therethrough.

12. A paper material as set forth in claim 8 wherein said hydroscopic salt is lithium chloride.

13. A paper material as set forth in claim 8 wherein said particles are gamma alumina.

14. A paper material as set forth in claim 8 wherein a substantial amount of the hydroscopic salt is captured in the pores of the micro porous particles.

15. A plate type heat exchanger comprising:
a substrate; said substrate formed from a paper material having a water sorption capacity; and
a calendared sheet formed from a mixture including thermoplastic organic fibers, micro porous particles, and a hydroscopic salt; said hydroscopic salt is lithium chloride, lithium bromide, or combinations thereof.

16. A plate type heat exchanger as set forth in claim 15 wherein a substantial amount of the hydroscopic salt is captured in the pores of the micro porous particles.

17. A plate type heat exchanger comprising:
a substrate; said substrate formed from a material having water sorption capacity; and
a calendared sheet formed from a mixture including organic fibers, a transition alumina or titania micro porous particles, and a hydroscopic salt; said hydroscopic salt is lithium chloride, lithium bromide, or combinations thereof.

18. A plate type heat exchanger as set forth in claim 17 wherein a substantial amount of the hydroscopic salt is captured in the pores of the micro porous particles.

19. A method for forming a paper material having water sorption capacity comprising:
forming an aqueous slurry, including organic fibers and micro porous particles;
mixing said slurry;
feeding said mixed slurry into a paper making apparatus, thereby forming a sheet;
contacting said sheet with a solution containing an amount of hydroscopic salt, said hydroscopic salt is lithium chloride, lithium bromide, or combinations thereof;
drying said hydroscopic salt containing solution
and calendaring said sheet.

20. A method as set forth in claim 19 further including adding wood pulp to said slurry.

21. A method as set forth in claim 19 further including slitting said sheet containing hydroscopic salt, thereby forming multiple sheets.

22. A method as set forth in claim 21 further including feeding at least one of said slit sheets into a corrugation machine whereby said at least one sheet is corrugated.

23. A method as set forth in claim 22 further including placing said corrugated sheet in contact with another sheet, heating said corrugated sheet and the other sheet whereby the corrugated sheet becomes adhered to the other sheet.

24. A method as set forth in claim 23 wherein said corrugated sheet is adhered to the other sheet without the use of an adhesive.

25. A method as set forth in claim 19 wherein said micro porous particles are titania or a transition alumina.

26. A method as set forth in claim 19 wherein said organic fibers are thermoplastic and are taken from the group consisting of polyvinyl alcohol, polyethylene, terathialate, acrylic polyethylene terathialate, or bicomponent fibers made from two of the above fibers.

27. A method as set forth in claim 19 wherein the amount of hydroscopic salt in said solution containing said hydroscopic salt is 8.3% wt, or less.

* * * * *